US009990343B2

(12) United States Patent
McNaught et al.

(10) Patent No.: US 9,990,343 B2
(45) Date of Patent: Jun. 5, 2018

(54) SYSTEM AND METHOD FOR IN-BROWSER EDITING

(71) Applicant: SYNERGY PLATFORM PTY LTD, Brendale (AU)

(72) Inventors: Scott David McNaught, Warner (AU); Ben Andreas Weigt, Wynnum (AU); Robert Bruce Coleman, Chermside West (AU)

( * ) Notice: Subject to any disclaimer, the term of this patent is extended or adjusted under 35 U.S.C. 154(b) by 156 days.

(21) Appl. No.: 15/193,985

(22) Filed: Jun. 27, 2016

(65) Prior Publication Data

US 2017/0371852 A1 Dec. 28, 2017

(51) Int. Cl.
| | |
|---|---|
| *G06F 9/44* | (2018.01) |
| *G06F 17/22* | (2006.01) |
| *G06F 17/27* | (2006.01) |
| *G06F 17/21* | (2006.01) |
| *G06F 3/0482* | (2013.01) |

(52) U.S. Cl.
CPC ........ *G06F 17/2247* (2013.01); *G06F 3/0482* (2013.01); *G06F 17/211* (2013.01); *G06F 17/218* (2013.01); *G06F 17/272* (2013.01)

(58) Field of Classification Search
None
See application file for complete search history.

(56) References Cited

U.S. PATENT DOCUMENTS

| | | | | |
|---|---|---|---|---|
| 9,830,575 | B1* | 11/2017 | Mund | G06Q 10/105 |
| 2003/0025732 | A1* | 2/2003 | Prichard | G06F 8/38 715/765 |
| 2003/0158854 | A1* | 8/2003 | Yoshida | G06F 17/30569 |
| 2006/0020921 | A1* | 1/2006 | Pasumansky | G06F 11/3636 717/124 |
| 2008/0195626 | A1* | 8/2008 | Ukigawa | G06F 17/2247 |
| 2008/0229188 | A1* | 9/2008 | Kostoulas | G06F 17/2247 715/234 |
| 2011/0252041 | A1* | 10/2011 | Broman | G06F 17/30616 707/748 |
| 2014/0047413 | A1* | 2/2014 | Sheive | H04L 65/403 717/110 |
| 2014/0164352 | A1* | 6/2014 | Denninghoff | H03H 9/02622 707/711 |
| 2016/0062963 | A1* | 3/2016 | Umapathy | G06F 17/2247 715/760 |

* cited by examiner

*Primary Examiner* — Chameli Das
(74) *Attorney, Agent, or Firm* — James M. Smedley LLC; James Michael Smedley, Esq.

(57) ABSTRACT

The present invention relates to an in-browser editor. Specifically, embodiments of the present invention provide a system and method of editing content in a browser without having to rely on the particular in-browser editing technology, such as "contentEditable" and "innerHTML." The system includes a parser that converts an input string representing content edits in the browser into a data structure known as an Intermediary DOM (document object model). The Intermediary DOM provides a completely accurate representation of editor content in real time and operates in tandem with the Browser DOM to render the edited content in the Intermediary DOM back into displayable content.

8 Claims, 8 Drawing Sheets

SYSTEM AND METHOD FOR IN-BROWSER EDITING

FIELD OF THE INVENTION

The present invention relates to an editor of mark-up and scripting languages (e.g HTML, CSS, and JavaScript). Specifically, embodiments of the present invention provide a system to enable an in-browser editor of content and a method of using the in-browser editor.

BACKGROUND

In-browser editors have become highly popular as ways to author online documents, emails, and edit websites. Typically, these editors work using a widely used in-browser technology known as "contentEditable." The contentEditable attribute can be enabled by a developer on any HTML element on a page to gain access to the basic functionality of blinking cursor/text caret for manipulation of the contents of that element. To access the manipulations made by the end-user, a developer can then call upon the "innerHTML" property of the element.

Web browsers natively parse and construct a data structure called a "document object model" (Browser DOM). Calling innerHTML converts this data structure back to text.

The use of contentEditable and innerHTML is inherently unreliable and is only suited for basic rich text manipulation. When using this technique, the integrity of the original source code is easily lost. For instance, invalid markup, formatting whitespace, and capitalization of tag names and attributes is lost because the Browser DOM does not contain such information.

In addition, there are significant changes between the implementations of contentEditable and innerHTML between different browsers. Further, reliance on contentEditable, creates a dependence on the browser's native implementation of handling selection which also differs between browsers and is easily lost (for instance, if a user clicks outside of the editor). There is therefore a need in the art for a system and method that maintains the integrity of the original source code when mark-up language is being edited across different browser platforms.

SUMMARY OF THE INVENTION

Accordingly, it is an aspect of the present invention to provide a system and method that provides an in-browser editor that reliably maintains the integrity of the original source code when mark-up language is being edited using any browser.

According to an embodiment of the present invention, the present invention consists of five sub-systems which operate as follows:

Subsystem 1—A Parser is used to convert an input string to a data structure called an "Intermediary DOM."

Subsystem 2—The Intermediary DOM provides a data structure that contains all of the data that was in the original input string. This includes data for whitespace, parse errors, and any additional data that cannot be represented in a Browser DOM. The Intermediary DOM data structure is therefore an accurate, comprehensive, and reliable source of editor content. Intermediary DOM elements that have a visual representation in the editor create render nodes within the Browser DOM.

Subsystem 3—The native Browser DOM is used to display the contents of the editor on the screen. Modifications to the Intermediary DOM affect the Browser DOM.

Subsystem 4—Events are bound in an event handling subsystem within the native browser in order to handle and record user events such as key presses and clicks. Mutations are made to the Intermediary DOM which has nodes that reference the user events. For example, keyboard input from a user causes the system to insert references to the inputted characters into nodes in the Intermediary DOM, so that the referenced characters reflect the user's key entries. Corresponding render nodes are then created in the Browser DOM to display the events, such as edits to a browser document.

Subsystem 5—Selection is handled by creating another data structure which represents the state of what text or elements are selected by the user. Event listeners are bound within the Browser DOM to capture user events such as mouse down, mouse move and key presses. For instance, clicking the mouse down on an element and dragging creates a selection. The Selection's data structure references and indexes into the Intermediary DOM.

Subsystem 6—The editor content in the Intermediary DOM can be converted to a string using, for example, a toString() method. The string can then be used to save or get the contents of the editor back out as HTML or another mark-up language.

According to an embodiment of the invention, any string given as input to the Parser and converted to the Intermediary DOM can be changed back to a string with exact equivalence. Another advantage is that the native browser is not relied upon for handling the structure of nodes or selection. This ensures consistency between browsers. Furthermore, the introduction of an Intermediary DOM allows for custom elements to be visualized with additional styles and sub elements in the browser DOM. A custom intermediary DOM element can consist of multiple child Browser DOM elements. For example a chart could contain one selectable and mutable element in the Intermediary DOM, but be represented as a set of elements in the Browser DOM to visualize the chart element as a set of strokes and lines.

DETAILED SPECIFICATION

The present invention relates to an in-browser editor of content. Specifically, embodiments of the present invention provide a system and method of operation for an in-browser editor.

Figure 1:
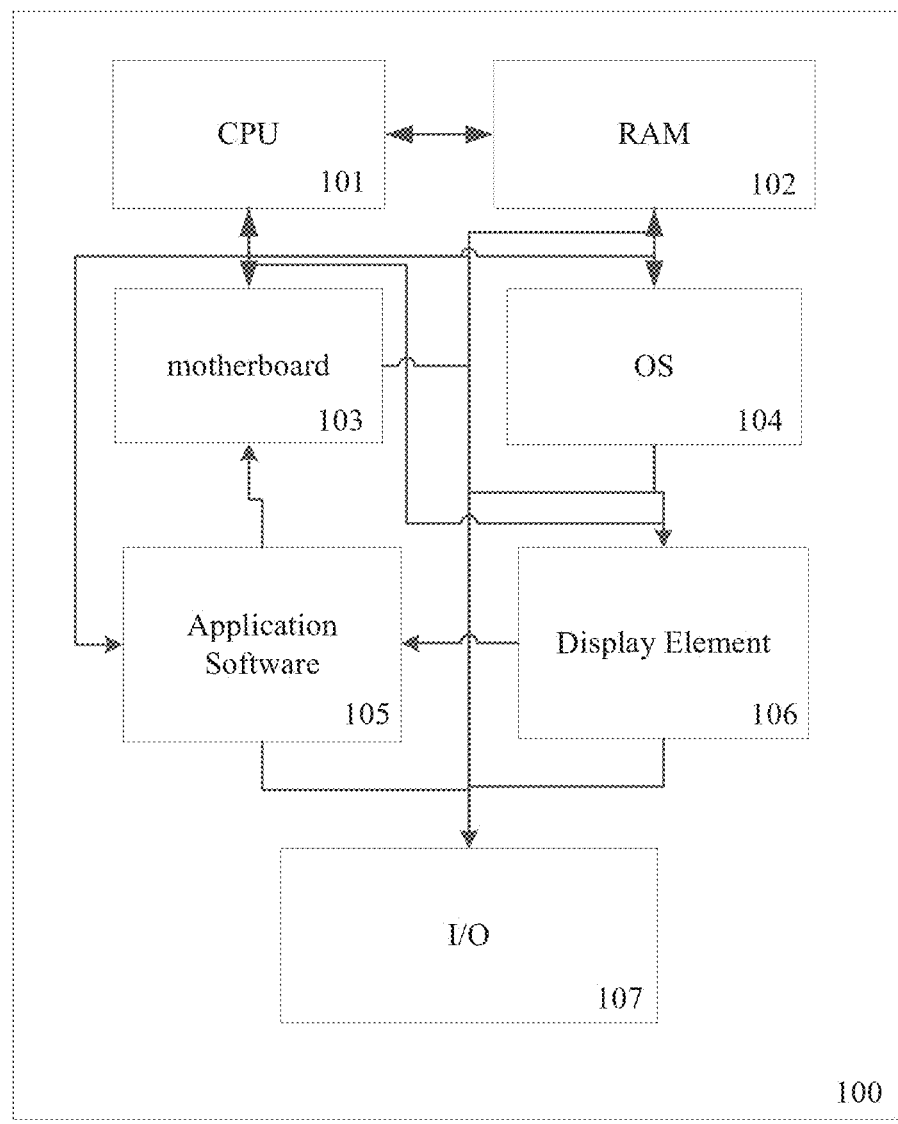
FIG. 1 illustrates a schematic overview of a computing device, in accordance with an embodiment of the present invention.

According to an embodiment of the present invention, the system and method is accomplished through the use of one or more computing devices. As shown in FIG. 1, one of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage) 103, an operating system (OS) 104, one or more application software 105, one or more programming languages 106 and one or more input/output devices/means 107. Examples of computing devices usable with embodiments of the present invention include, but are not limited to, personal computers, smart phones, laptops, mobile computing devices and tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
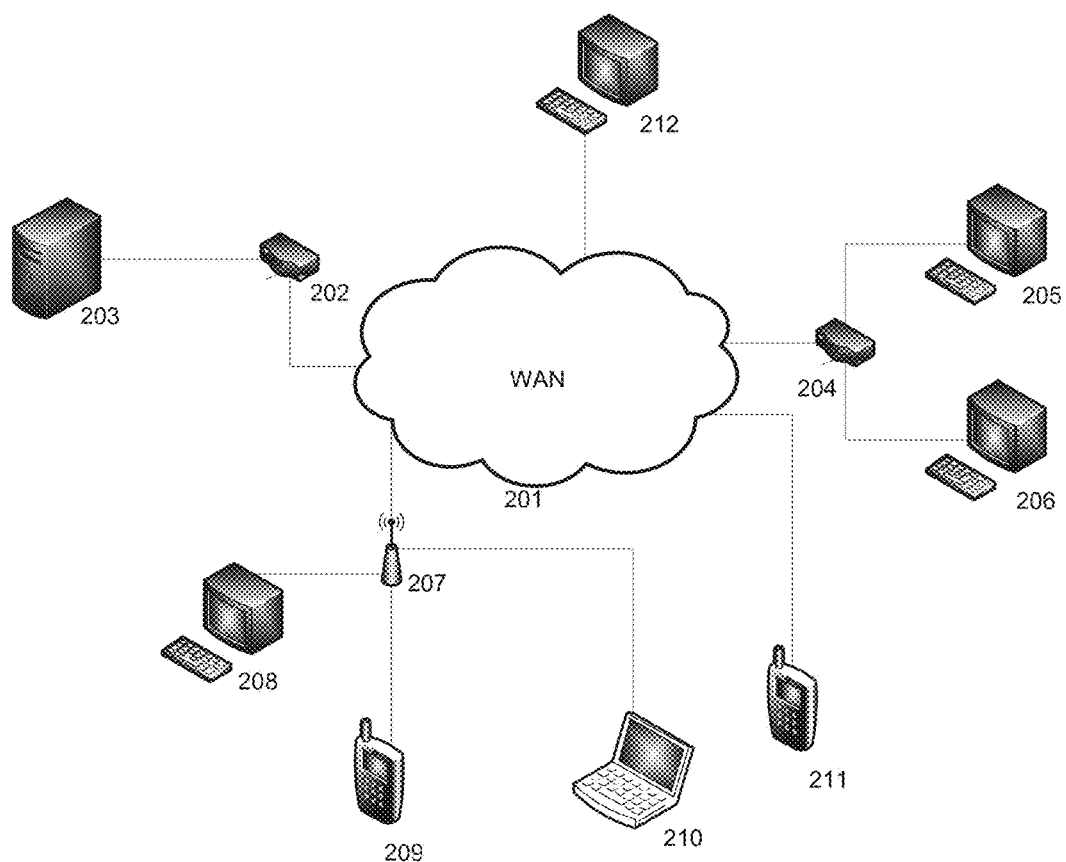
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers 203 for electronically storing information used by the system. Applications in the application server 203 may retrieve and manipulate information in storage devices and exchange information through a Network 201 (e.g., the Internet, a LAN, WiFi, Bluetooth, etc.). Applications in server 203 may also be used to manipulate information stored remotely and process and analyze data stored remotely across a Network 201 (e.g., the Internet, a LAN, WiFi, Bluetooth, etc.).

According to an exemplary embodiment, as shown in FIG. 2, exchange of information through the Network 201 may occur through one or more high speed connections. In some cases, high speed connections may be over-the-air (OTA), passed through networked systems, directly connected to one or more Networks 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to Network 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via Network 201 or other network in numerous ways. For instance, a component may connect to the system i) through a computing device 212 directly connected to the Network 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the Network 201. One of ordinary skill in the art would appreciate that there are numerous ways that a component may connect to server 203 via Network 201, and embodiments of the present invention are contemplated for use with any method for connecting to server 203 via Network 201. Furthermore, server 203 could be comprised of a personal computing device, such as a smartphone, acting as a host for other computing devices to connect to.

The present invention is configured for use in mark-up language (e.g. HTML) editors wherein changes can be made to browser content that are more accurate and reliable than existing in-browser editing technology, such as "contentEditable" and "innerHTML," which are native to the browser.

The present invention provides a system and method for in-browser editing of content, where the edits are fully and accurately reflected in an Intermediary DOM linked to a browser's native Browser DOM. Edits made to the displayed content in the browser are accurately reflected in the mark-up language source code stored as elements in the Intermediary DOM in real time. Accordingly, a user can make changes to browser content without loss of any data such as whitespace, capitalization of tag names, and attributes, which are generally not retained by the native Browser DOM during the editing process.

The present invention enables true edit reflection in the source code and display view by use of a plurality of subsystems, including a Parser, an Intermediary DOM, a Browser DOM, an event handling subsystem, a selection subsystem, and a toString converter. In accordance with the invention, when a change is made to the displayed content, it is fully and accurately reflected in the Intermediary DOM by parsing the source HTML or other mark-up language such as XML, XHTML, XML, and LaTeX. For example, the Parser converts an input string in the form of HTML code that reflects in-browser edits by a user to a data structure which is the Intermediary DOM. In this manner, the browser content display view, HTML source code and intermediary DOM tree are maintained in synchronization.

The Intermediary DOM provides a data structure that is reliable and a true reflection of editor content, since it contains all of the data that was in the original input string. This includes data for whitespace, parse errors, and additional data that cannot be represented in a Browser DOM. The Intermediary DOM thus serves as the single and central source of truth for what the editor contains.

Figure 5:
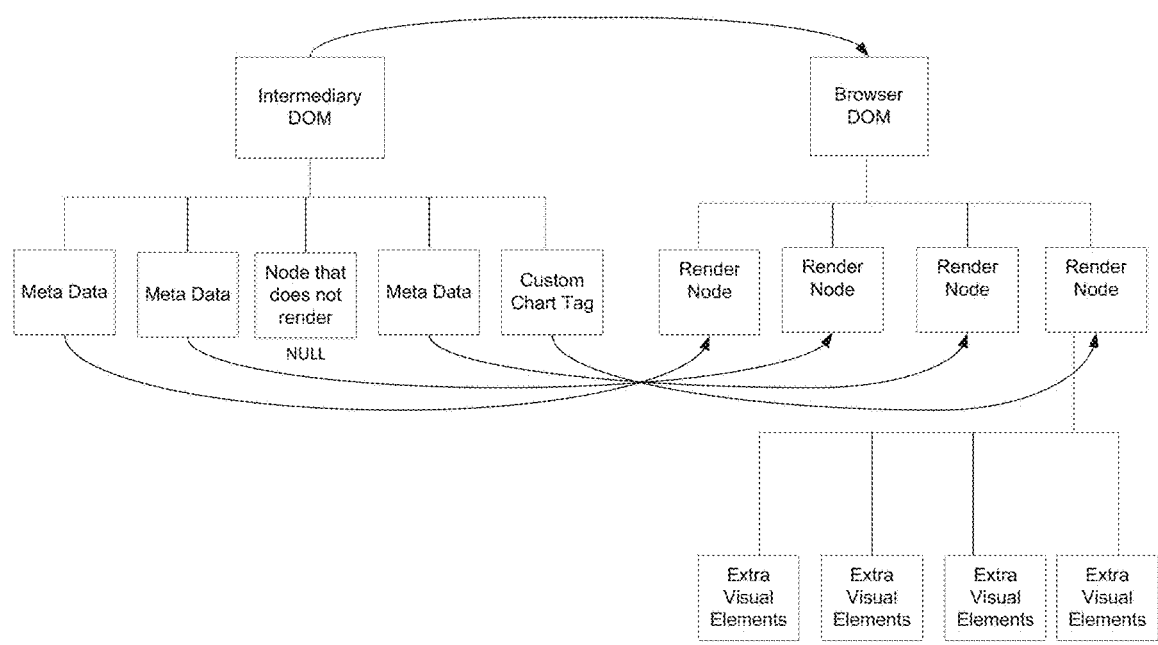
FIG. 5 illustrates data links between an Intermediary DOM and a Browser DOM in accordance with the present invention.

The Intermediary DOM is linked to the Browser's native Browser DOM which is used to display the contents of the editor on the screen. In addition, a custom intermediary DOM element can consist of multiple child Browser DOM elements as shown in FIG. 5. For example a complex node such as a chart could contain one selectable and mutatable element in the Intermediary DOM, but be represented as a set of elements in the Browser DOM to visualize the chart element as a set of strokes and lines. Intermediary DOM elements that have a visual representation in the editor create render nodes within the Browser DOM, since the Browser DOM is used to display the contents of the editor on the screen. Furthermore, modifications to the Intermediary DOM affect the Browser DOM, since Intermediary DOM elements create render nodes in the Browser DOM so that the Intermediary DOM can use the Browser DOM to render edited content in the browser.

Selection of content elements within the browser can be handled by another data structure which represents the state of what text or elements are selected by the user. Specifically, the selection data structure can be used to retain data elements representing user selection of content. Event listeners embedded in the Browser DOM capture user events such as mouse down, mouse move, touches and key presses, and the events are accurately reflected in the selection structure. For instance, clicking the mouse down on an element and dragging creates a selection event that is stored in the selection structure. The selection data structure may reference and index to the Intermediary DOM. For example, the selection data structure may reference editor content in the Intermediary DOM that is selected by the user.

The Intermediary DOM can be converted to a text string using the toString( ) method, which can then be saved or output to the browser as a mark-up language string for processing.

Figure 3A:
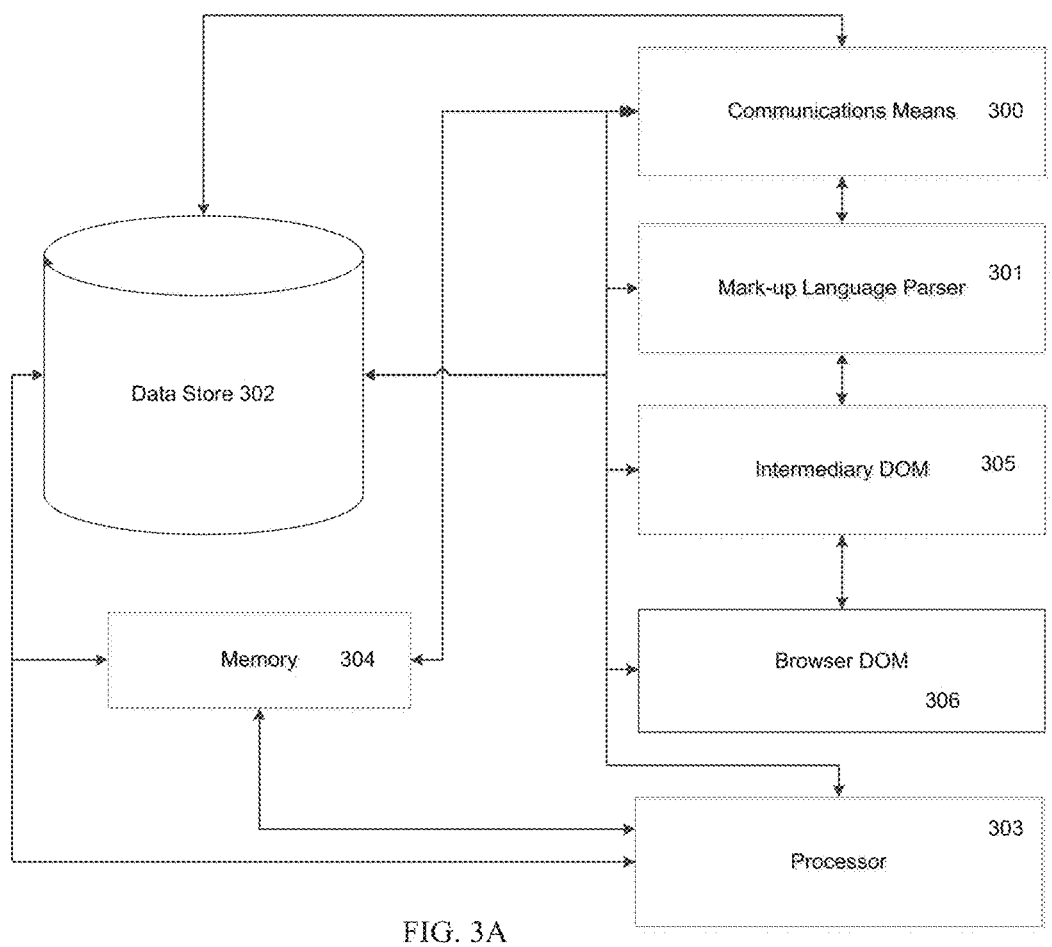
FIG. 3A illustrates data flow between different components of the system, in accordance with an embodiment of the present invention.
Figure 3B:
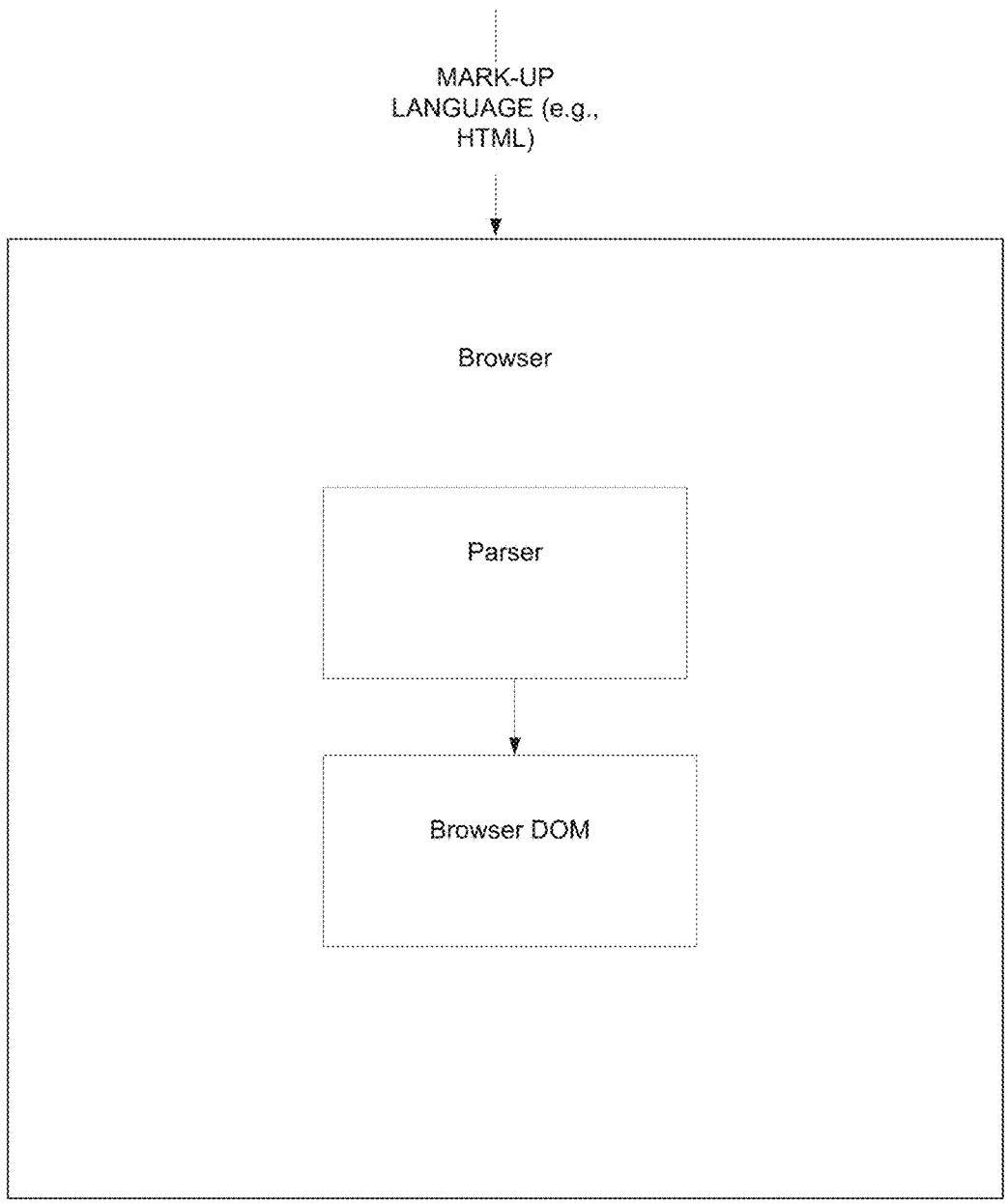
FIG. 3B illustrates a prior art system of in-browser editing of browser content.

Turning to FIG. 3A, according to an embodiment of the present invention, a system for in-browser editing of browser content is comprised of one or more communications means 300, one or more data stores 302, a processor 303, memory 304, a mark-up language parser 301, an Intermediary DOM 305, and a Browser DOM 306. FIG. 3B illustrates a prior art system for editing browser content in a display view. As a user makes changes to the content, the contents are modified and stored in nodes of the native Browser DOM.

Figure 3C:
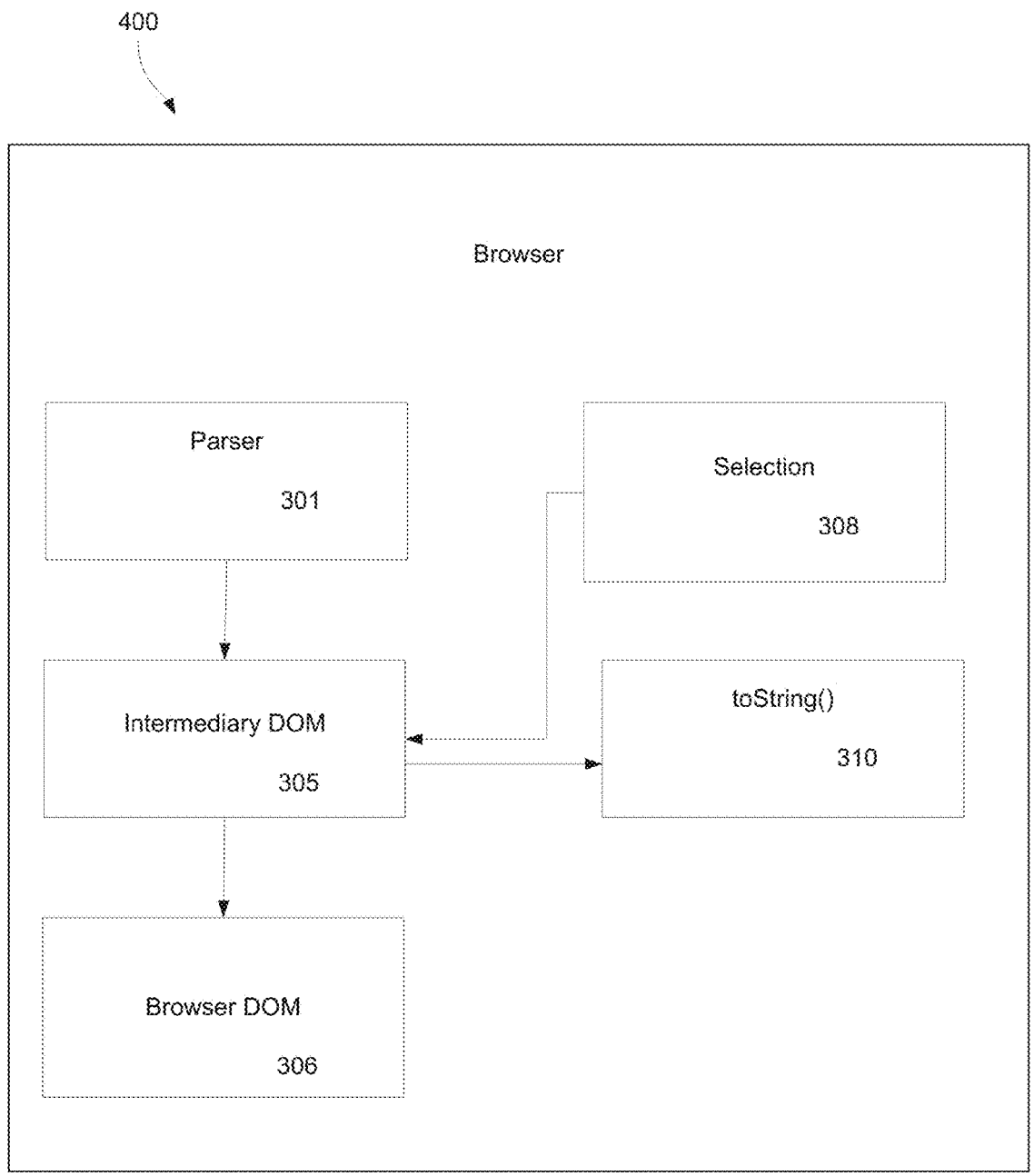
FIG. 3C illustrates a schematic of a system for in-browser editing of browser content, in accordance with an embodiment of the present invention.

In FIG. 3C, according to an embodiment of the present invention, a system for editing a mark-up language in a browser is comprised of one or more of a parser 301, Intermediary DOM subsystem 305, a browser DOM subsystem 306, a user event handling subsystem, a selection subsystem 308, and a toString( ) method 310.

Figure 4:
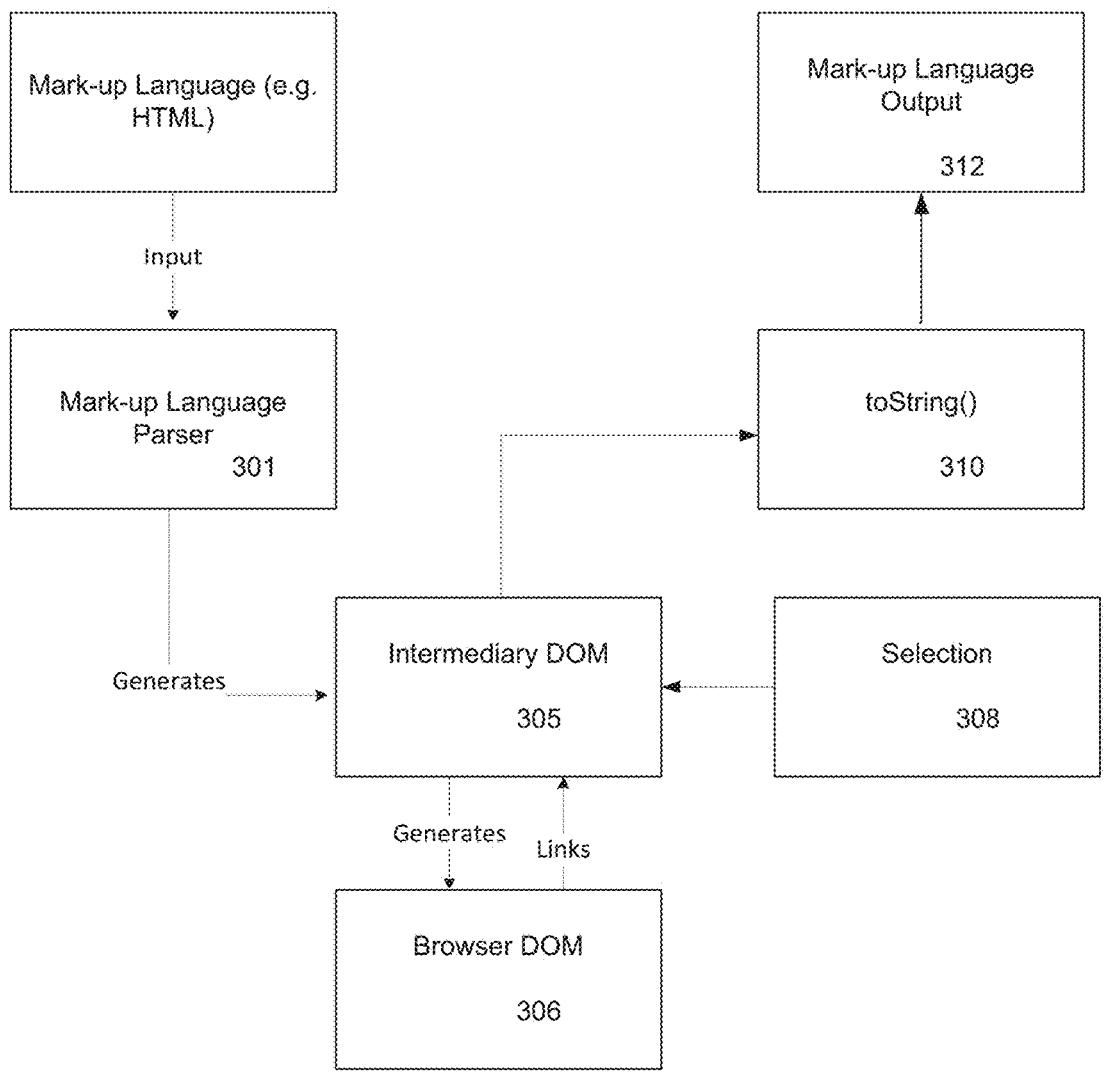
FIG. 4 is a process flow diagram of an in-browser editor in accordance with embodiments of the present invention.

FIG. 4 is a block diagram illustrating the basic components of the present invention and their relationships to each other. In a browser environment, a user will retrieve and open content, such as an HTML document, in browser 400. The browser will parse the document using parser 301 and build the intermediary DOM tree 305 of the document when opened. The DOM tree can be graphically rendered on a computer display monitor. The HTML file also can be rendered directly as text view in another view on the display monitor. In order to render a display view of the HTML file, the Intermediary DOM links to the Browser DOM 306, so that the Intermediary DOM has control over Browser DOM display elements. The Browser DOM includes render nodes, as shown in FIG. 5, to render the object model for display. Hence, the Intermediary DOM contains the source-side components, while the Browser DOM contains the display-side components.

Selection subsystem 308 tracks user initiated events such as mouse clicks and mouse movements which are stored as metadata in the intermediary DOM tree. The system calls the toString( ) method 310 to convert the source-side components and metadata in the intermediary DOM back to HTML code 312.

One particular application of the invention is in an editor for building and editing HTML documents from any browser without losing formatting, invalid mark-up syntax, and other changes that are lost by using the in-browser editing technology such as "contentEditable" and "innerHTML."

In accordance with the invention, when an HTML document is opened and parsed, the system generates an intermediary DOM tree 305. During the process of editing browser content on the display side, when a change is made, the content changes in the Intermediary DOM nodes. The particular edit may result in either a change to the content of an intermediary DOM node, deletion of an intermediary DOM node, or adding a new Intermediary DOM node to the tree. The HTML elements stored in the intermediary DOM tree are then linked to a corresponding browser DOM 306 which renders the data to a display. However, any intermediary DOM nodes that are not visually renderable, such as parse errors or markup comments, are sometimes not linked to the browser DOM since they do not render.

In addition, the browser tracks user initiated events, such as mouse clicks and mouse movements, using event listeners and stores indexes or references to the selected text or nodes in a selection data structure 308. The selection data structure may be a separate data structure linked to the Browser DOM and Intermediary DOM, or may be a branch of the Browser DOM.

As previously discussed, the Intermediary DOM nodes are linked to the Browser DOM nodes so that any changes recorded in the Intermediary DOM as a result of edits are reflected in the Browser DOM. Further, the Intermediary DOM converts all of the data in its nodes back to HTML output 312 using the toString( ) method 310 and displays the edited HTML in the browser. In this manner, all changes made to content are accurately and fully reflected in the source code and the browser.

FIG. 5 is a schematic diagram illustrating the link between the Intermediary DOM tree and the Browser DOM tree. As can be seen in the Figure, the Intermediary DOM tree stores metadata in its nodes, including information that would otherwise be lost if a user relied on the existing in-browser editing technology of contentEditable and innerHTML. The Browser DOM includes one or more render nodes containing data that is rendered on the display as browser content. At least one of the render nodes may include a branch of leaf nodes containing extra visual elements for display in the browser.

A description of each of the subsystems of the in-browser editor follows below.

Subsystem 1—A Parser is used to convert an input string to a data structure called an Intermediary DOM. When an application program (e.g., an HTML Editor) receives an HTML document, several steps are performed to convert that HTML document into a displayed (or rendered) page on the user's screen. In one embodiment, first, the HTML document is opened and parsed to build a document object model (DOM) containing the data. Document Object Model is a programming interface specification developed by the World Wide Web Consortium (W3C) that lets a programmer create and edit HTML and XML files as program objects. The W3C has recently issued a DOM level 3 specification which is incorporated herein by reference. A DOM essentially is a tree data structure representation of an HTML file, wherein each node of the tree is an HTML element, e.g., a tag, an attribute, a value, etc. After the DOM is generated, it is traversed to create an object model. Where the HTML page is to be converted into a display, the object model is the model from which the display is directly rendered. Thus, the process of rendering an HTML page can be considered to comprise four steps; (1) the HTML document step, (2) the document object model step, (3) the object model step, and (4) the actual display step. The Intermediary DOM essentially serves as a secondary DOM that stores HTML elements that are not retained by the browser DOM.

Subsystem 2—The Intermediary DOM provides a data structure that is more reliable than the browser DOM. It contains all of the data that was in the original input string. This includes data for whitespace, parse errors, and additional data that is not represented in a Browser DOM. The Intermediary DOM therefore more accurately reflects editor contents. Intermediary DOM elements that have a visual representation in the editor create render nodes within the Browser DOM.

Subsystem 3—The native Browser DOM is used to display the contents of the editor on the screen. Modifications to the Intermediary DOM affect the Browser DOM since they are linked. More specifically, nodes in the Intermediary DOM are linked to corresponding nodes in the browser DOM. The only exceptions are Intermediary DOM nodes that hold NULL values, which do not render and are not linked to a corresponding browser node.

Subsystem 4—Events are recorded in an event handling subsystem within the native browser in order to handle and record user events such as key presses and clicks. Mutations are made to the Intermediary DOM nodes that reference user events, such as editing content in the browser. For example, keyboard input from a user causes the system to insert references to inputted characters in the Intermediary DOM that reflect the user's key entries. Corresponding render nodes are then created in the Browser DOM to display the events, including, for example, edits to a browser document.

Subsystem 5—Selection is handled by creating another data structure which represents the state of what text or elements are selected by the user. Event listeners are bound within the Browser DOM to capture user events such as mouse down, mouse move and key presses. For instance, clicking the mouse down on an element and dragging creates a selection. The results of selection events tracked by the event listeners are retained in the Selection data structure which references and indexes into the Intermediary DOM.

Subsystem 6—the toString( ) method converts the Intermediary DOM referenced editor content to a string which is saved or output as source code, such as HTML, to the browser for processing. Any string given as input to the Parser and converted to the Intermediary DOM can thus be changed back to a string with exact equivalence.

Additional or fewer subsystems or components may be utilized in alternate embodiments. For instance, one alternate embodiment includes an editing tool plugin to handle user edits of a browser document. The editing tool may be similar to a common word processing toolbar that includes well known editing functions such as bold, underline, cut, copy, paste, font size, font style, etc. When a user selects a function from the editing tool the event capture subsystem records the event and the Intermediary DOM which is updated accordingly. Specifically, nodes are inserted or deleted in the Intermediary DOM based on the events. For example, selecting the bold option from the editing tool causes a bold tag to be inserted in a parent node of content selection nodes that identify content to be bolded. The browser DOM is automatically updated in accordance with changes to the Intermediary DOM. This process of capturing user initiated events, reflecting the events in the Intermediary DOM, and automatically updating the browser DOM in accordance with changes to the Intermediary DOM applies to all events, including content editing events.

The in-browser content editor of the present invention is not only completely accurate in reflecting changes to the displayed content, but is also consistent across different browser platforms because the native browser is not relied upon for handling the structure of nodes or selection. Specifically, the implementation of contentEditable and innerHTML varies from one browser to another. Accordingly, this leads to inconsistent rendering of edited browser content. The present invention avoids such inconsistency by not relying on the native browser to handle the structure of nodes or selection. This ensures consistency between browsers.

The introduction of an Intermediary DOM allows for custom elements to be visualized with additional styles and sub elements in the browser DOM. A custom intermediary DOM element can consist of multiple child Browser DOM elements. For example a chart could contain one selectable and mutatable element in the Intermediary DOM, but be represented as a set of elements in the Browser DOM to visualize the chart element as a set of strokes and lines (see e.g., FIG. 5). As shown in FIG. 5, the custom chart tag in the Intermediary DOM is represented as a set of visual elements in the Browser DOM. One or ordinary skill will recognize that any node in the Intermediary DOM can be represented as a single node or a plurality of render nodes in the Browser DOM.

Exemplary Embodiment

Figure 6:
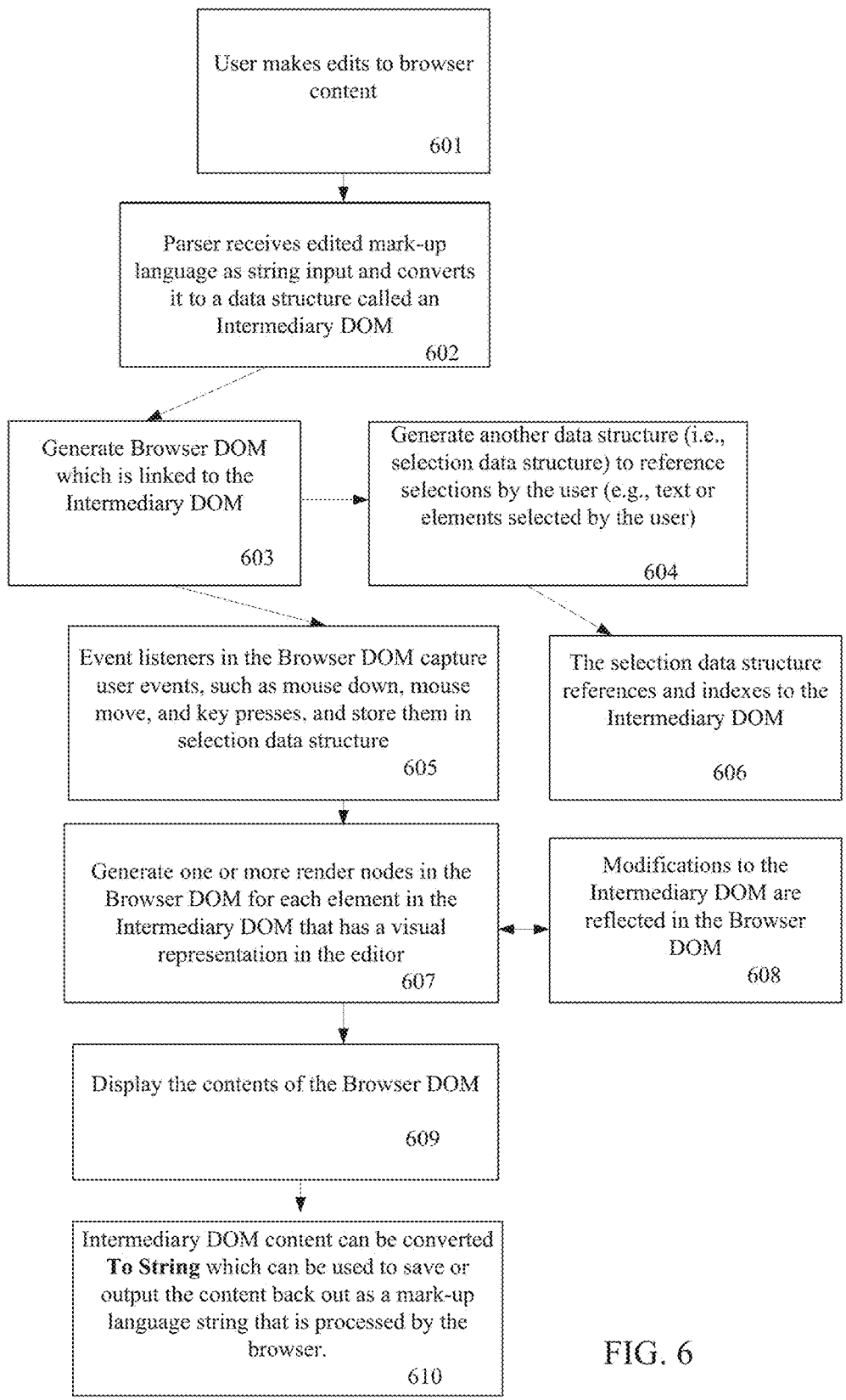
FIG. 6 illustrates an exemplary method of using the browser editor of the present invention.

Turning now to FIG. 6, an exemplary embodiment of the present invention is shown. The process starts at step 601 with content being loaded into the editor. At step 602, the Parser receives an input string, such as edited HTML code, and converts it to a data structure known as the Intermediary DOM (document object model). The Intermediary DOM contains all of the data that was in the original input string which cannot be represented in a Browser DOM.

At step 603, the system generates a Browser DOM which is linked to the Intermediary DOM. At step 604, the system generates another data structure, i.e., a selection data structure, to retain selections by the user (e.g., text or elements selected by the user). However, the selection data structure may be a branch of a node in the Browser DOM, rather than a separate data structure. At step 606, the selection data structure references and indexes nodes in the Intermediary DOM (e.g. nodes containing elements of the selected content).

At step 605, event listeners in the Browser DOM capture user events, such as mouse down, mouse move, and key presses, and stores what is selected in the selection data structure. At step 607, the Intermediary DOM generates one or more render nodes in the Browser DOM for each element in the Intermediary DOM that has a visual representation in the editor. Furthermore, any modifications to the Intermediary DOM are reflected in the Browser DOM as shown in step 608.

At step 609, the contents of the Browser DOM are displayed on a user screen. At step 610, Intermediary DOM content can be converted to a string using a toString( )

method, or the like. The string can be saved or output as a mark-up language string to the browser for processing. Thus, any string provided as input to the Parser and converted to the Intermediary DOM can be changed back to a string of exact equivalence.

The Browser DOM displays the contents of the editor on the screen. Intermediary DOM elements that have a visual representation in the editor generate render nodes within the Browser DOM. Moreover, any modifications to the Intermediary DOM are reflected in the Browser DOM.

Event listeners in the Browser DOM are configured to capture user events such as mouse down, mouse move, and key presses. The event listeners can therefore be used to populate the selection data structure from user initiated events.

At step 606, the Intermediary DOM contents (i.e. editor content) is converted back to a string of source code using the ToString method. The string can be saved and/or output back to the browser.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on.

Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, JAVA, JAVASCRIPT, ASSEMBLY LANGUAGE, LISP, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. An in-browser content editor comprising:
   a processor;
   a non-transitory computer readable memory;
   a display in communication with said processor and said memory; and
   a plurality of subsystems comprising:
   1) a parser that converts a mark-up language document comprising data displayed in a browser into an Intermediary DOM (Document Object Model) comprising a plurality of data nodes, wherein said Intermediary DOM stores elements of the document that are not represented in a native browser DOM of the browser;
   2) the Intermediary DOM which contains all of the data that was in the mark-up language document, including data for whitespace, parse errors, capitalization of tag names, mark-up language attributes, and any other source code data that is not represented in the native browser DOM;
   3) the native browser DOM which displays content of the in-browser editor on a display, wherein most nodes in the Intermediary DOM are linked to corresponding nodes in the native browser DOM, wherein modifications to the Intermediary DOM are reflected in the native browser DOM, wherein the only nodes in the Intermediary DOM that are not linked to corresponding nodes are Intermediary DOM nodes that contain elements that are not visually renderable on the display;
   4) an event handling subsystem that handles and records user-initiated input events, wherein the Intermediary DOM includes nodes that reference the input events and corresponding render nodes are created in the native browser DOM;
   5) a selection data structure that contains selections of browser content made by the user in the in-browser editor; and
   6) a content converter configured to convert browser content in the Intermediary DOM into a string, which can then be saved or output to the browser as a mark-up language string for processing;
   whereby edits made to the displayed content in the browser are accurately reflected in source code of the mark-up language document stored as elements in the Intermediary DOM in real time, and displayed browser content, mark-up language document source code, and the Intermediary DOM are maintained in synchronization.

2. The in-browser editor of claim 1, wherein said native browser DOM comprises event listeners configured to capture user input events.

3. The in-browser editor of claim 1, wherein said Intermediary DOM, native browser DOM, and selection data structure are linked.

4. The in-browser editor of claim 1, wherein said native browser DOM is used to render said Intermediary DOM elements on a display.

5. The in-browser editor of claim 1, wherein render nodes are generated within the native browser DOM for any Intermediary DOM elements having a visual representation in the in-browser editor thereby enabling the Intermediary DOM to use the native browser DOM to render edited content in the browser.

6. The in-browser editor of claim 1, wherein the Intermediary DOM converts all of the data in its nodes, at least some of which reflects edits to the browser content, back into HTML output using a toString( ) method and displays the edited HTML in the browser.

7. A method of editing content in a browser comprising the steps of:
 converting a mark-up language document displayed in a browser into an Intermediary DOM (Document Object Model) comprising a plurality of data nodes, wherein said Intermediary DOM stores elements of the document that are not represented in a native DOM of the browser,
 wherein the Intermediary DOM contains all source code data for the mark-up language document, including data for whitespace, parse errors, capitalization of tag names, mark-up language attributes, and any other source code data that is not represented in the native browser DOM,
 wherein most nodes in the Intermediary DOM are linked to corresponding nodes in the browser DOM, wherein modifications to the Intermediary DOM are reflected in the browser DOM, wherein the only nodes in the Intermediary DOM that are not linked to corresponding nodes are Intermediary DOM nodes that contain elements that are not visually renderable on a display;
 handling and recording user-initiated input events, wherein the Intermediary DOM includes nodes that reference the input events and corresponding render nodes are created in the browser DOM;
 converting browser content in the Intermediary DOM into a string which can then be saved or output to the browser as a mark-up language string for processing;
 whereby edits made to displayed content in the browser are accurately reflected in real time in source code of the mark-up language document stored as elements in the Intermediary DOM, and
 wherein displayed browser content, mark-up language document source code, and the Intermediary DOM are maintained in synchronization.

8. The method of claim 7, wherein said Intermediary DOM, native browser DOM, and selection data structure are linked.

* * * * *